United States Patent
Schnell et al.

(10) Patent No.: US 6,939,215 B2
(45) Date of Patent: Sep. 6, 2005

(54) METHOD FOR REDUCING VISCOSITY OF MECHANICALLY SEPARATED MEATS AND GROUND MEATS

(75) Inventors: Timothy D. Schnell, Sun Prairie, WI (US); Mark A. Oldenburg, Madison, WI (US); Andrew L. Milkowski, Cottage Grove, WI (US); Shawn M. Hass, Sun Prairie, WI (US)

(73) Assignee: Kraft Foods Holdings, Inc., Northfield, IL (US)

(*) Notice: Subject to any disclaimer, the term of this patent is extended or adjusted under 35 U.S.C. 154(b) by 0 days.

(21) Appl. No.: 10/347,090

(22) Filed: Jan. 17, 2003

(65) Prior Publication Data

US 2004/0142649 A1 Jul. 22, 2004

(51) Int. Cl.[7] .............................................. A22C 11/00
(52) U.S. Cl. ......................................................... 452/30
(58) Field of Search .................................... 452/30, 198

(56) References Cited

U.S. PATENT DOCUMENTS

| | | | |
|---|---|---|---|
| 3,029,150 A | | 4/1962 | Bickel et al. |
| 3,675,567 A | * | 7/1972 | Rejsa et al. .................. 99/533 |
| 4,210,677 A | * | 7/1980 | Huffman ..................... 426/272 |
| 4,313,963 A | * | 2/1982 | Greenspan ................... 426/58 |
| 4,514,094 A | * | 4/1985 | Buckholz et al. ......... 366/160.1 |
| 4,667,370 A | * | 5/1987 | Brockington et al. ....... 426/524 |
| 4,675,947 A | * | 6/1987 | Clatfelter et al. ............ 426/416 |
| 4,708,055 A | * | 11/1987 | Matsumoto et al. .......... 99/484 |
| 4,731,906 A | * | 3/1988 | Matthews et al. .......... 99/450.7 |
| 4,852,477 A | * | 8/1989 | Schubring et al. ......... 99/450.2 |
| 5,840,359 A | * | 11/1998 | Lechthaler et al. ......... 426/516 |
| 5,997,925 A | * | 12/1999 | Wilson et al. ............... 426/332 |
| 6,099,891 A | | 8/2000 | Gundlach et al. |
| 6,406,730 B1 | * | 6/2002 | Banyard et al. ......... 426/330.3 |

FOREIGN PATENT DOCUMENTS

| | | |
|---|---|---|
| EP | 0 951 843 | 10/1999 |
| GB | 714 500 | 9/1951 |
| GB | 754 406 | 8/1956 |
| GB | 1 256 445 | 3/1972 |

* cited by examiner

Primary Examiner—Thomas Price
(74) Attorney, Agent, or Firm—Fitch, Even, Tabin & Flannery

(57) ABSTRACT

The present invention is directed to a method and system for reducing viscosity of mechanically separated meat in an amount effect to allow the mechanically separated meat to be transported through processing equipment at reduced pumping pressures. In accordance with the invention, pyrophosphate is blended with the mechanically separated meat in an amount effective for reducing the viscosity of the mechanically separated meat.

16 Claims, 2 Drawing Sheets

METHOD FOR REDUCING VISCOSITY OF MECHANICALLY SEPARATED MEATS AND GROUND MEATS

The present invention relates to a method for reducing the viscosity of mechanically separated meats and ground meats. More particularly, mechanically separated meat or ground meat is blended with an amount of pyrophosphate effective for reducing the viscosity of the meat which allows the meat to be pumped long distances through processing equipment at lower pressures.

BACKGROUND

Mechanically separated meat and ground meat are typically used in a number of food processing and manufacturing systems. During processing, the meat is transported to various processing steps through pipes using pumps. The mechanically separated meat is viscous, thus, increased pumping pressures are required to maintain desirable flow rates. High pump pressures, i.e. greater than 200 psig, tend to cause excessive pump wear, rupturing of pump rotors, and increased maintenance. High pumping pressure may also activate pressure overload switches which result in a system shut down.

High pumping pressures may also diminish the quality of the mechanically separated meat. For example, when pumping at high pressures, temperatures may increase as much as 4° F. Further, higher pressures may result in higher oxidation rates in the meat and high shear rates may deteriorate emulsion stability in products made with this raw material.

The viscosity of mechanically separated and ground meats may be reduced through the addition of water. Water addition in amount sufficient to reduce viscosity to desired levels may result in product having unacceptably high levels of water in the finished product. Typical water additions may range from 0.5 to 3.0 gallons per minute with meat flow rates ranging from 400 to 1000 lbs./minute in a meat pumping system.

SUMMARY

The present invention is directed to a method for transporting mechanically separated meat and ground meat through a processing system. The method reduces the viscosity of the mechanically separated meat or ground meat which is effective for providing a more easily pumpable mechanically separated meat or ground meat. Thus the mechanically separated meat or ground meat can be pumped through existing processing equipment at lower pumping pressures. The lower pumping pressures are beneficial in providing lower processing costs and in maintaining the functionality and quality of the meat.

In one aspect of the invention, mechanically separated meat or ground meat is blended with pyrophosphate in an amount effective for reducing the viscosity of the mechanically separated meat or ground meat as compared to mechanically separated meat or ground meat which has not been blended with pyrophosphate. In this aspect of the invention, the mechanically separated meat or ground meat is blended with about 0.1 to about 0.5 weight percent pyrophosphate, based on the weight of the meat pyrophosphate blend. The pyrophosphate may be sodium pyrophosphate, potassium pyrophosphate, other phosphates such as tripolyphosphates which rapidly convert to pyrophosphate in meat or mixtures thereof. The pyrophosphate may be added to the meat in a dry form or in a liquid form. An important aspect, the meat does not require further blending with water to achieve reduced viscosity.

Mechanically separated meats and ground meat which may be used in accordance with the method of the invention includes poultry, beef, pork and mixtures thereof. In a very important aspect, mechanically separated meat is poultry such as chicken and turkey.

The method of the invention is effective for lowering processing costs. In this aspect of the invention, mechanically separated meat or ground meat that has been blended with pyrophosphate has a viscosity that allows the meat to be pumped from about 50 to about 165 feet with a pumping pressure of about 200 psig or less at a flow rate of about 400 to about 1000 lbs/minute. Lower pumping pressures result in less damage and wear to the pumps which reduces maintenance costs.

The method of the invention is also effective for maintaining the functionality and quality of the meat being processed. In this aspect of the invention, mechanically separated meat or ground meat does not increase in temperature more than about 2° C. when the meat or ground meat is pumped about 250 feet. In another aspect, the method is also effective for not increasing the oxidation value (TBA) to more than about 1–3 ppm when the mechanically separated meat or ground meat is pumped about 250 feet.

The present invention also provides a system for processing mechanically separated meat and ground meat. The system includes a feed hopper for mixing and transporting. The meat is transported from the feed hopper and past the phosphate application wand which is effective for uniformly applying phosphate to the meat. The system also includes at least one pump for transporting the meat through the system.

DETAILED DESCRIPTION

Definitions

Figure 1:
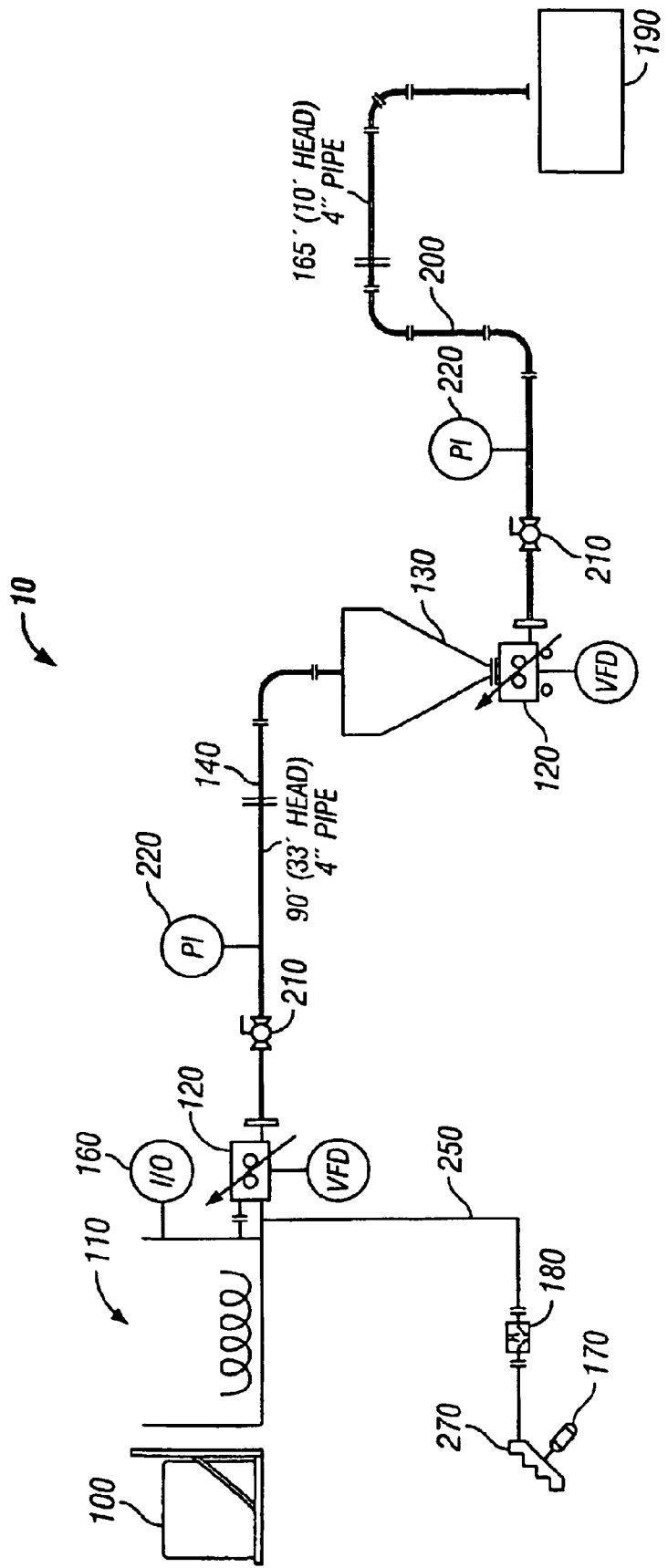
FIG. 1 is a schematic view of a meat processing system.

Unless defined otherwise, all technical and scientific terms used herein have the same meaning as commonly understood by one of ordinary skill in the art to which this invention belongs. All patents and publications referred to herein are incorporated by reference herein. For purposes of the present invention, the following terms are defined below.

Mechanically separated meat is generally defined in 9 CFR 319.5 which is herein incorporated by reference. As used herein, "mechanically separated meat" refers to finely comminuted product resulting from the mechanical separation and removal of most of the bone from attached skeletal muscle of livestock carcasses and parts of carcasses. Examples of such a product are "Mechanically Separated Beef", Mechanically Separated Veal", "Mechanically Separated Pork", Mechanically Separated Lamb" and "Mechanically Separated Poultry". At least 98 percent of the bone particles present in such a product shall have a maximum size of no greater than 0.5 millimeter in their greatest dimension and there shall be no bone particles larger than 0.85 millimeter in their greatest dimension. The product resulting from the separating process shall not have a calcium content exceeding 0.75 percent, as a measure of a bone solids content of not more than 3 percent, and shall have a minimum PER of 2.5.

As used herein, a "pumpable mechanically separated meat" means a mechanically separated meat that has been blended with an amount of pyrophosphate effective for reducing the viscosity of the blend as compared to mechanically separated meat that has not been blended with pyrophosphate. The reduction in viscosity is sufficient to allow the pumpable mechanically separated meat to be pumped long distances (up to about 165 feet), at low pressure (less than about 200 psig)

"Ground Meat" is generally defined in 9CFR 319.15 which is incorporated herein by reference. As used herein, "ground meat" refers to "Ground Beef, "Ground Veal, "Ground Lamb", "Ground Pork" and "Ground Poultry" shall consist of chopped fresh and/or frozen meat with or without seasoning and without the addition of fat as such, shall not contain added water, phosphates, binders, or extenders. When cheek meat (trimmed beef cheeks) is used in the preparation of chopped or ground beef, the amount of such cheek meat shall be limited to the 25 percent.

"Hamburger" shall consist of chopped fresh and/or frozen beef with or without the addition of beef fat as such and/or seasoning, shall not contain more than 30 percent fat, and shall not contain added water, phosphates, binders, or extenders.

"Beef Patties" shall consist of chopped fresh and/or frozen beef with or without the addition of beef fat as such and/or seasonings, binders, or extenders. Mechanically separated (species) used in accordance with Sec. 319.6 and/or partially defatted beef fatty tissue may be used without added water or with added water only in amounts such that the product characteristics are essentially that of a meat pattie.

"Fabricated Beef Steaks", "Veal Steaks", Beef and Veal Steaks", or "Veal and Beef Steaks", and similar products, such as those labeled "Beef Steak, Chopped, Shaped, Frozen", "Minute Steak, Formed, Water Sliced, Frozen, Hydrolyzed Plant Protein, and Flavoring" shall be prepared by comminuting and forming the product from fresh and/or frozen meat, with or without added fat, of the species indicated on the label. Such products shall not contain more than 30 percent fat and shall not contain added water or extenders. Transglutaminase enzyme at levels of up to 65 ppm may be used as a binder.

As used herein a "pumpable ground meat" means a ground meat that has been blended with an amount of pyrophosphate effective for reducing the viscosity of the blend as compared to ground meat meat that has not been blended with pyrophosphate. The reduction in viscosity is sufficient to allow the pumpable mechanically separated meat to be pumped long distances (up to about 165 feet), at low pressure (less than about 200 psig).

The method of the present invention is effective for reducing the viscosity of the mechanically separated meat without adding water. As used herein, "without added water" means that no water is added to the mechanically separated meat during the pumping process. Pyrophosphate may be added to the mechanically separated meat in an aqueous solution. Aqueous solutions of pyrophosphate may be an aqueous concentrate having a pyrophosphate concentration of up to 60 weight percent.

Oxidation or TBA is measured by extracting a meat sample with acid; taking the filtered extract and conducting a reaction with thiobatbturic acid (TBA reagent) to generate a color which is quantified spectrophotometrically. The assay is calibrated against color developed from a standard using malondialdehyde and results are expressed as ppm malondialdehyde equivalents in the meat. This is also often referred to as the TBA value.

A processing system for processing mechanically separated meat 10 is shown in FIG. 1. Containers of meat or mechanically separated meat are placed on a lift dump station 100 that dumps the meat into an auger feed hopper 110. Any type of feed hopper known in the art may be used. The auger feed hopper 110 augers meat towards a positive displacement pump 120 which pumps the meat into a large storage vessel 130 through 4" diameter stainless steel pipe 140. The distance to the storage vessel is up to 90' which also includes 33' of head. The positive displacement pump 120 shown in FIG. 1 is a lobe pump, but vane and progressive cavity styles of positive displacement pumps may also be used.

To reduce meat viscosity, liquid potassium pyrophosphate is added to the meat by an application wand 160 which is placed in the flow of the meat moving toward the pump 120. The application wand 160 is located in front of the meat pump 120, and the mechanical action of the pump mixes the phosphate with the meat.

The liquid phosphate is metered into the meat flow using a peristaltic pump 170 that pumps the phosphate to the application wand 160. The amount of phosphate delivered to the meat is controlled by the speed of the peristaltic pump 170, or it can be controlled through the use of a flow meter 180 and a different type of positive displacement pump.

From the storage vessel 130, the meat is pumped up to 165' distance (10' head) to the blender 190 through a 4" diameter stainless steel pipe 200. No additional phosphate addition is needed when pumping from the storage vessel to the mixer because the previously added phosphate remains capable of reducing meat viscosity. Processing may be further controlled and monitored using valves 210 and gauges 220.

The use of dry phosphate addition to the meat also results in a reduction of meat viscosity which facilitates low pressure pumping over long distances. In this aspect of the invention, dry granular or powdered phosphate is mixed with the meat prior to or during pumping of the meat, such as, for example, in the sugar feed hopper 110.

Figure 2:
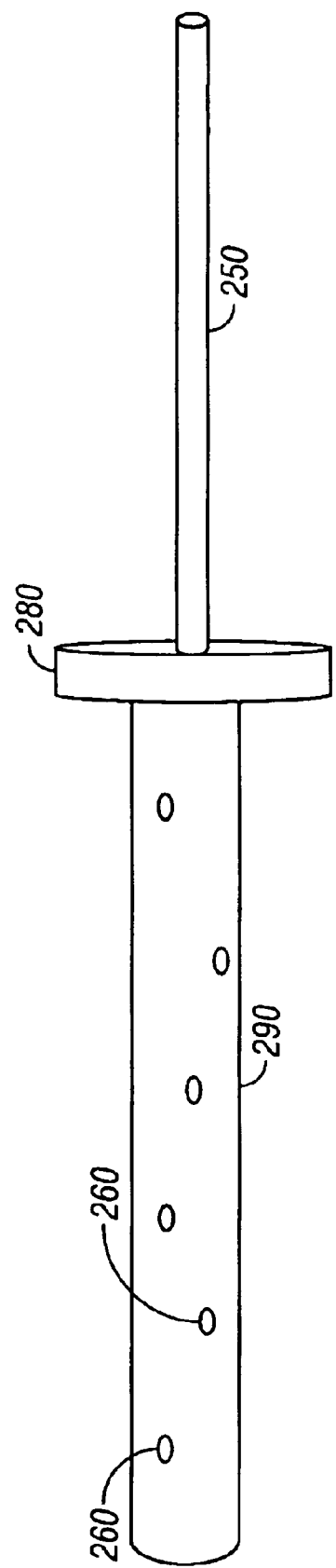
FIG. 2 illustrates a phosphate application wand.

FIG. 2 illustrates a phosphate application wand 160. The phosphate application wand 160 includes tubing 250 for transporting phosphate to the wand. The phosphate application wand 160 includes phosphate output holes 260 that are effective for evenly distributing phosphate in meat flow. The phosphate application wand 160 further includes a base 280 and wand body 290.

When the system shown in FIG. 1 is in operation, phosphate from a phosphate storage vessel 270 is pumped by peristaltic pump 170 via tubing 250 to the phosphate application wand 160. The wand body 290 of the phosphate application wand 160 extend into the flow of meat prior to the meat reaching the pump 120.

Pyrophosphate

Phosphate sources according to the invention include a variety of phosphate salts and polyphosphates. As discussed herein, a polyphosphate may require time to dissociate so as to free individual diphosphate moieties which are found to achieve the beneficial effect in accordance with the invention. Thus, as a general rule, the more complex the phosphate source, the more likely some will have to be added at an upstream injection location, rather than at a more downstream injection location into the meat flow. Generally speaking, the phosphate source can be added at between about 0.1 to about 0.5 weight percent phosphate, based upon the meat being treated. A preferred range is between about 0.15% and about 0.25% phosphate. Generally speaking, higher levels do not further reduce meat viscosity and typically will be avoided.

Examples of phosphate sources include sodium pyrophosphate (a diphosphate), potassium pyrophosphate, sodium tripolyphosphate and potassium tripolyphosphate. Also available and useful are blends of sodium or potassium acid pyrophosphate, tetrasodium pyrophosphate, tetrapotassium pyrophosphate, potassium hexametaphosphate, sodium hexametaphosphate or other such polyphosphates. They can be in particulate form, which is preferred, or in liquid form, such as when the phosphate is within an aqueous carrier.

Without being bound by any theory of a functional mechanism regarding this invention, it is believed that the phosphate addition as discussed herein reduces the viscosity of the meat. It is well known that myosin and actin two proteins of muscle tissue which is the precursor of meat, "slide" with respect to each other during muscle contraction. In meat these proteins are complexed to form a new species called actomyosin. Diphosphate causes dissociation of actomyosin back into the myosin and actin components resulting in a loosening of this muscle structure so that actin protein and myosin can move around more easily This dissociation is reflected in a decrease in viscosity of ground meat and mechanically separated meat or greater pliability of intact meat pieces.

The following examples illustrate methods for carrying out the invention and should be understood to be illustrative of, but not limiting upon, the scope of the invention which is defined in the appended claims.

EXAMPLES

Example I

Effect of Potassium Pyrophosphate on Mechanically Separated Chicken Viscosity Mechanically separated chicken was mixed with concentrated potassium pyrophosphate (60%), water and lactate at the levels indicated below Each sample was pumped from the ground floor to the storage vessel and then from the storage vessel to the mixer (see diagram). The pressure to pump the sample from to the storage vessel and then to the mixer was recorded.

| Treat-ment | Mechanically Separated Chicken (lbs) | Phosphate (lbs) | Lactate (lbs) | Water (lbs) | Pressure to Pump 90' (33 head; psig) | Pressure Pump 165' (10' head; psig) |
|---|---|---|---|---|---|---|
| 1 | 8000 | 12 (0.15%) | 300 | 642 | 80 | 90 |
| 2 | 8000 | 12 (0.15%) | 0 | 642 | 90 | 95 |
| 3 | 8000 | 0 | 300 | 642 | 115 | 135 |
| 4 | 2000 | 5 (0.25%) | 75 | 47 | 90 | 100 |

In the current test (Table 2), 60% concentrate potassium pyrophosphate was added to MSC from two different vendors at levels of 0%, 0.15%, 0.25%, 0.35%, 0.45% and 0.55% on a 100% phosphate basis. Each sample was extruded through a 4 mm annulus, and the energy to extrude was measured.

TABLE 2

| | Pyrophosphate (%) | | | | | |
|---|---|---|---|---|---|---|
| | 0 | 0.15 | 0.25 | 0.35 | 0.45 | 0.55 |
| Energy to extrude MSC vendor 1 (Ft-lb s) | 97 | 77 | 85 | 83 | 79 | 78 |
| Energy to extrude MSC vendor 2 (Ft.-lbs) | 155 | 125 | 125 | 128 | 131 | 125 |

Numerous modifications and variations in practice of the invention are expected to occur to those skilled in the art upon consideration of the foregoing detailed description of the invention. Consequently, such modifications and variations are intended to be included within the scope of the following claims.

What is claimed is:

1. A method for transporting mechanically separated meat or ground meat through a processing system, the method comprising:

blending the mechanically separated meat or ground meat with an amount of pyrophosphate effective for providing a pumpable mechanically separated meat or ground meat; and transporting the pumpable mechanically separated meat or ground meat through the processing system.

2. The method of claim 1 wherein the meat can be transported through the system for up to about 165 feet with a pressure of not more than about 200 psig.

3. The method of claim 1 wherein the mechanically separated meat or ground meat is blended with about 0.15 to about 0.25 weight percent pyrophosphate, based on the weight of the meat/pyrophosphate blend.

4. The method of claim 1 wherein the pyrophosphate is blended as a dry powder or as a liquid.

5. The method of claim 1 wherein the pyrophosphate is selected from the group consisting of sodium pyrophosphate, potassium pyrophosphate, sodium tripolyphosphate, potassium tripolyphosphate, tetrasodium pyrophosphate, tetrapotassium pyrophosphate, potassium hexametaphosphate, sodium hexametaphosphate and mixtures thereof.

6. The method of claim 1 wherein the mechanically separated meat or ground meat is selected from the group consisting of poultry, beef, pork and mixtures thereof.

7. The method of claim 1 wherein transporting of the mechanically separated meat or ground meat does not increase a temperature of the mechanically separated meat or ground meat more than about 2° C. when the mechanically separated meat is transported about 250 feet.

8. The method of claim 1 wherein transporting of the mechanically separated meat or ground meat does not increase a TBA value of the meat more than about 1–3 ppm when the meat is transported about 250 feet.

9. A method for pumping mechanically separated meats or ground meat, the method comprising blending the mechanically separated meat or ground meat with an amount of pyrophosphate effective for providing a pumpable mechanically separated meat having a reduced viscosity and allowing the pumpable meat to be pumped from about 50 to about 165 feet with a pumping pressure of about 200 psig or less.

10. The method of claim 9 wherein the mechanically separated meat or ground meat is blended with about 0.15 to about 0.25 weight percent pyrophosphate, based on the weight of the separated meat pyrophosphate blend.

11. The method of claim 9 wherein the pyrophosphate is blended as a dry powder or as a liquid.

12. The method of claim 9 wherein the pyrophosphate is selected from the group consisting of sodium pyrophosphate, potassium pyrophosphate, sodium tripolyphosphate, potassium tripolyphosphate, tetrasodium pyrophosphate, tetrapotassium pyrophosphate, potassium hexametaphosphate, sodium hexametaphosphate and mixtures thereof.

13. The method of claim 9 wherein the mechanically separated meat or ground meat is selected from the group consisting of poultry, beef, pork and mixtures thereof.

14. The method of claim 13 wherein the mechanically separated meats or ground meat is poultry.

15. The method of claim 9 wherein pumping of the mechanically separated meat or ground meat does not increase a temperature of the meat more than about 2° C. when the meat is pumped about 250 feet.

16. The method of claim 9 wherein pumping of the mechanically separated meat or ground meat does not increase a TBA value of the meat more than about 1–3 ppm when the meat is pumped about 250 feet.

* * * * *

UNITED STATES PATENT AND TRADEMARK OFFICE
CERTIFICATE OF CORRECTION

PATENT NO. : 6,939,215 B2
DATED : September 6, 2005
INVENTOR(S) : Timothy D. Schnell et al.

It is certified that error appears in the above-identified patent and that said Letters Patent is hereby corrected as shown below:

<u>Title page,</u>
Item [57], ABSTRACT,
Line 3, delete "effect" and insert -- effective --.

Signed and Sealed this

Ninth Day of May, 2006

JON W. DUDAS
*Director of the United States Patent and Trademark Office*